United States Patent
Gross

(10) Patent No.: US 6,702,938 B2
(45) Date of Patent: Mar. 9, 2004

(54) ODOR REDUCTION SYSTEM FOR WASTE HOLDING TANKS

(76) Inventor: Donald Gross, 7240 Standard Dr., Hanover, MD (US) 21076

( * ) Notice: Subject to any disclaimer, the term of this patent is extended or adjusted under 35 U.S.C. 154(b) by 278 days.

(21) Appl. No.: 10/033,089

(22) Filed: Oct. 25, 2001

(65) Prior Publication Data

US 2003/0080055 A1 May 1, 2003

(51) Int. Cl.[7] .............................................. B60R 15/00
(52) U.S. Cl. .................... 210/150; 210/220; 210/241; 210/242.2
(58) Field of Search ................................ 210/150, 220, 210/241

(56) References Cited

U.S. PATENT DOCUMENTS

| | | | |
|---|---|---|---|
| 3,477,949 A | 11/1969 | Liliendahl | |
| 3,666,103 A | 5/1972 | Green | |
| 3,673,082 A | * 6/1972 | Reid | ........................ 210/612 |
| 3,780,997 A | 12/1973 | Hargraves | |
| 3,904,525 A | * 9/1975 | Rosenberg | ................... 210/150 |
| 4,096,592 A | 6/1978 | Clark | |
| 5,830,358 A | 11/1998 | White | |
| 5,928,514 A | 7/1999 | Gothreaux | |

* cited by examiner

*Primary Examiner*—Chester T. Barry
(74) *Attorney, Agent, or Firm*—Rankin, Hill, Porter & Clark LLP

(57) ABSTRACT

An odor reducing assembly for use in a marine vessel or RV waste holding tank including an aeration tube and an aeration pump. The aeration tube is disposed in a bottom portion of the holding tank. The aeration tube may be provided by a separate aeration tube or may be incorporated into the macerator/discharge pump. The aeration pump is in fluid communication with the aeration tube and supplies pressurized air to the aeration tube during operation of the marine vessel or RV. The aeration tube is disposed in a bottom-most portion of the holding tank and is submerged in sewage. Pressurized air from the aeration pump is injected into the sewage via the aeration tube and creates an oxygen-enriched aerobic environment therein. Air from the holding tank is continuously vented to atmosphere during operation of the aeration pump via a vent in the tank.

6 Claims, 5 Drawing Sheets

ODOR REDUCTION SYSTEM FOR WASTE HOLDING TANKS

BACKGROUND OF THE INVENTION

1. Field of the Invention

The present invention generally pertains to marine and recreational vehicle (RV) waste holding tanks and, more particularly, odor reduction systems for such waste holding tanks.

2. Description of Related Art

The direct overboard discharge of untreated sewage from toilets aboard marine vessels has been prohibited by law for many years. Waste from toilets is generally flushed by the toilet system into a holding tank where it is held for treatment, or for disposal into a land-based sewage handling system. For safety reasons, the holding tank is always vented to atmosphere. As a result, each time additional sewage is flushed into the holding tank, air within the holding tank is displaced by incoming sewage, forcing foul-smelling air out the vent. Whether treated or untreated, the raw sewage generates odors that are unpleasant to the vessel's occupants, and to the occupants of nearby vessels or RVs. Present odor-reducing methods consist of filters that must be maintained or chemical additives that must be monitored, both of which require a measure of undesirable regular maintenance.

Therefore, there exists a need in the art for a method and device to reduce or minimize the generation and perception of odors from marine vessel waste holding tanks without the need for filters or chemical additives.

SUMMARY OF THE INVENTION

The present invention is directed toward a method and device for reducing or eliminating the odors emitted from a marine or RV waste holding tank.

In accordance with the present invention, a marine vessel or RV includes a waste holding tank, an aeration pump, an aeration tube, and a macerator/discharge pump. The waste holding tank is installed within the marine vessel or RV and has the aeration tube disposed in the tank, as close to the tank bottom as possible. The output of the aeration pump and aeration tube is in fluid communication with the waste in the holding tank, and is adapted for continuous operation such that air is continuously communicated to the aeration tube.

In further accordance with the present invention, because the waste holding tank is designed to intentionally retain a volume of sewage therein (regardless of the type and design of the discharge pump employed to evacuate the holding tank), the aeration tube is continuously submerged in sewage. The aeration tube continuously injects air into the sewage to create an oxygen-enriched environment in the sewage that assists in reducing the odors emanating from the sewage within the holding tank.

In further accordance with the present invention, the waste holding tank also includes an inlet for sewage, an outlet through which sewage is pumped-out of the holding tank, and a vent. The vent is continuously opened, under the influence of air from the aeration pump injected into the tank via the aeration tube, to expel air from the tank.

In further accordance with the present invention, a method for reducing perceived odors emanating from a marine vessel or RV waste holding tank is provided. The method includes the steps of:

a. submerging an aeration tube in sewage substantially continuously;

b. supplying pressurized air to the aeration tube substantially continuously to thereby inject air into the sewage surrounding the aeration tube and to create an oxygen-enriched condition in the sewage; and, c. opening the vent under the influence of the pressurized air to gradually and continuously expel air from the holding tank.

BRIEF DESCRIPTION OF THE DRAWINGS

These and further features of the present invention will be apparent with reference to the following description and drawings, wherein.

DETAILED DESCRIPTION OF THE PREFERRED EMBODIMENTS

Figure 1:
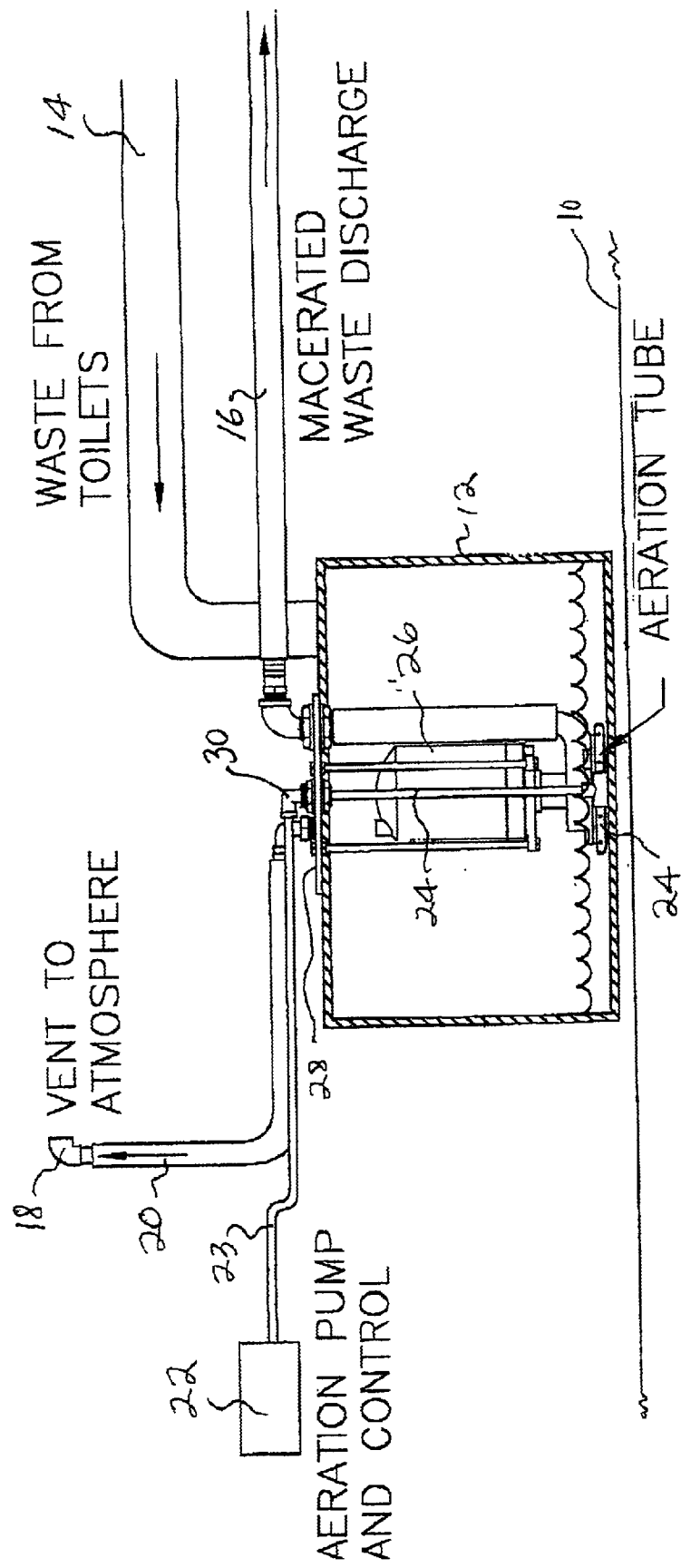
FIG. 1 schematically illustrates a first embodiment of a marine vessel or RV including a waste holding tank, an aeration pump, and an in-tank aeration-capable macerator/discharge pump.

With reference to FIG. 1, a marine vessel or recreational vehicle (RV) 10 is shown to include a waste holding tank 12 having an inlet 14, an outlet 16, a vent 18, and a macerator/discharge pump 26. The vent 18, which is continually open to the atmosphere to establish communication between the tank interior and atmosphere via a conduit 20, may include a check valve, if desired. The inlet 14 receives sewage from one or more toilets as well as other waste sources, such as sinks, etc. The waste holding tank 12 is disposed in a hold of the marine vessel or RV, together with an aeration pump 22. The aeration pump 22 supplies a constant flow of pressurized air via a flexible tube 23 to an aeration tube 24 which, according to the first embodiment is secured to the macerator/discharge pump 26 and will be described hereinafter.

The aeration pump 22 is preferably a low power DC pump, and is designed or adapted for continuous operation. In this regard, continuous operation means that the pump 22 is electrically connected to the vessel's DC power supply (batteries and battery charging system), and operates whenever battery power is available. However, it is also contemplated that it may be desirable to control aeration pump 22 operation at the DC power distribution panel. The macerator/discharge pump 26 preferably includes a mounting plate 28 by means of which the pump assembly 26 is secured to the tank 12. More specifically, an opening is formed in an upper surface of the tank and a body of the pump 26 is inserted through the tank opening. The mounting plate 28 is disposed over the opening and is secured to the tank at locations surrounding the opening. The pump 26 may be specifically sized and adapted to fit any desired holding tank.

The flexible tube 23 from the aeration pump 22 extends through an opening formed in the mounting plate 28 to the aeration tube 24. More specifically, a connector 30 extends through the mounting plate 28 and fluidly connects the flexible tube 23 to the aeration tube 24. The aeration tube 24 extends downwardly from the mounting plate 28. A bottom portion of the aeration tube 24 is disposed in the lowermost portion of the tank. The aeration tube 24 is disposed in the bottom-most part of the holding tank 12 so as to always be bathed or immersed in sewage, even after the holding tank 12 is pumped out, as noted hereinbefore. The bottom-most portion of the aeration tube 24 is preferably a rigid closed ring that is T-connected to an upstanding portion of the aeration tube. The upstanding portion, in turn, communicates with the flexible tube 23 from the aeration pump 22, as shown best in FIG. 2. Accordingly, the bottom-most portion of the aeration tube 24 will be continually submerged in sewage to provide continual aeration thereof. The aeration tube 24 has a series of small holes or openings formed therein through which pressurized air from the aeration pump 22 is forced from the tube 24 into the surrounding sewage. Preferably, either the aeration tube 24 or the flexible tube 23 has a check valve to prevent a back-flow or siphoning of sewage into the aeration tube 24 and/or the flexible tube 23 when the aeration pump 22 is turned off. The aeration tube 24 is made from a suitable corrosion-resistant material, such as a thermo-plastic or stainless steel.

The first embodiment of the present invention provides several advantages. First, the assembly is unitary and facilitates assembly and installation. Moreover, the assembly provided by the first embodiment is more easily accessible for maintenance and repair, if necessary.

While both aerobic bacteria and anaerobic bacteria are present in raw sewage, it is known that it is the anaerobic bacteria that produce undesirable odors. Continually aerating the sewage within the tank 12 establishes an oxygen-enriched environment that is believed to have beneficial results. While such an oxygen-enriched environment is believed to increase the rate of decomposition of the sewage within the tank 12, it is the resulting reduction in the amount and degree of foul odors provided by the oxygen-enriched environment that is the focus of the present invention. Furthermore, as will be discussed more fully hereinafter, constantly introducing air into the tank ensures that the vent is continuously opened whereby any odors in the tank are gradually expelled therefrom and replaced by fresh air. It is believed that the constant incremental expulsion of air from the tank reduces the vessel occupant's perception of odor from the tank. It is further believed that providing an oxygen-enriched environment together with incremental air expulsion reduces or minimizes any "odor pulse" that has heretofore resulted from the introduction of new waste into the holding tank. As such, the present invention provides a significant improvement in the art.

The tank 12 and discharge pump 26 are designed such that, when the sewage is pumped out via the outlet 16 for disposition at a land-based facility, or to a treatment module, a portion of the sewage is intentionally retained within the tank 12. The amount or volume of intentionally retained waste provides an "odor sink" to dilute the effects of newly introduced sewage. Therefore, the introduction of sewage into the tank 12 will not result in a burst of foul smelling gas via the vent 18, because the air within the tank will be relatively free of odor and the odors from the newly introduced sewage will be diluted by the larger volume of relatively odor-free air within the tank 12. Moreover, the release of odors to atmosphere resulting from the fresh sewage will be incremental, as noted hereinbefore, and thus will be relatively unnoticed and unobjectionable by the vessel's occupants.

Figure 2:
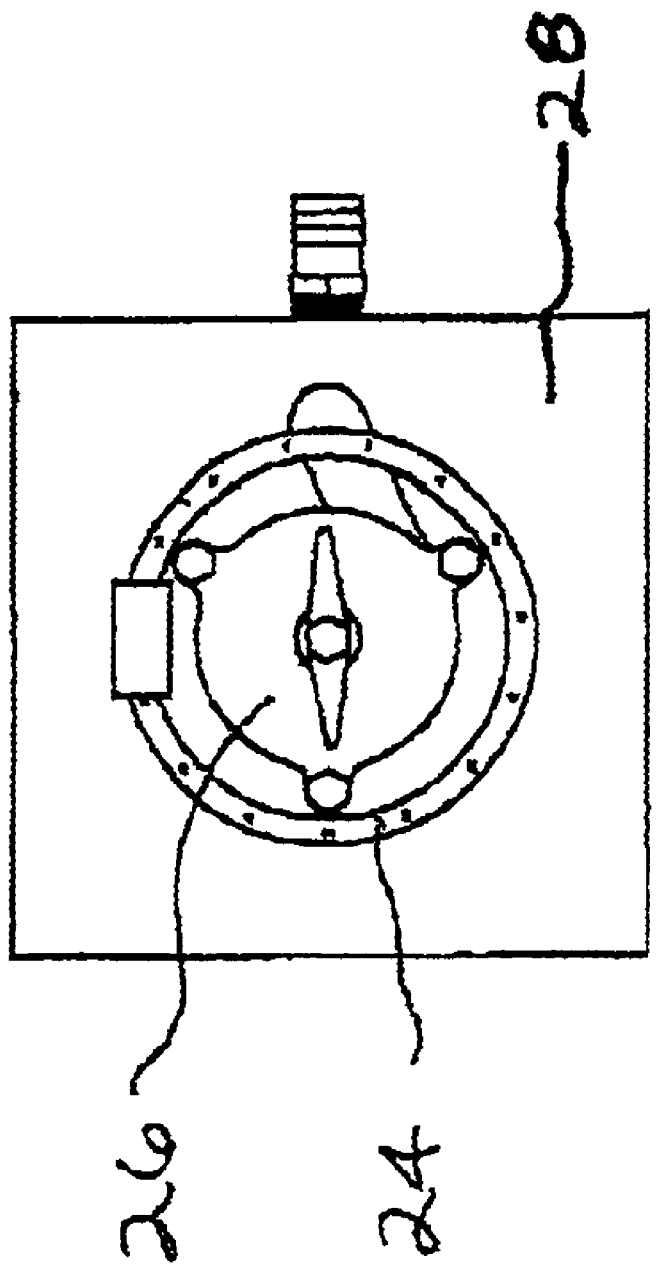
FIG. 2 is a schematic bottom plan view of the macerator/discharge pump shown in FIG. 1.
Figure 3:
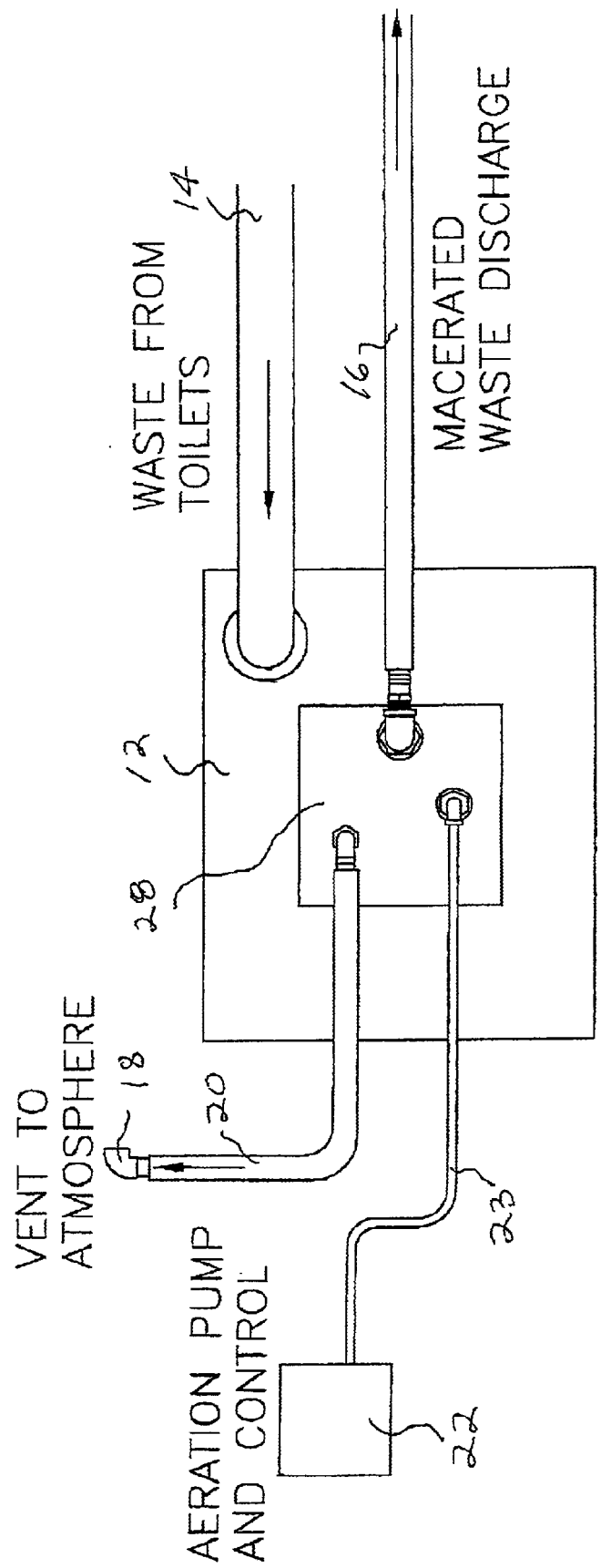
FIG. 3 is a schematic top plan view of the first embodiment shown in FIG. 1.
Figure 4:
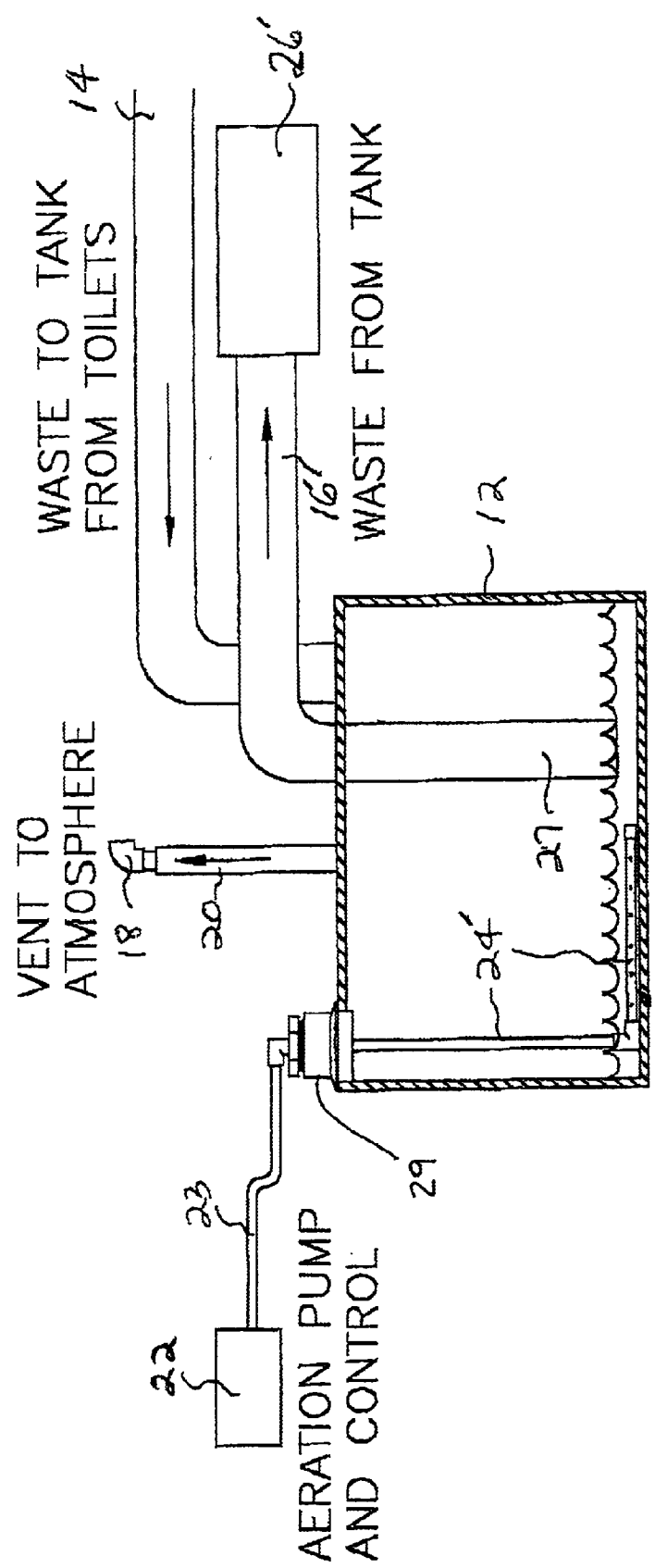
FIG. 4 schematically illustrates an example of a second embodiment of the present invention, wherein a discharge pump is disposed outside of the tank.
Figure 5:
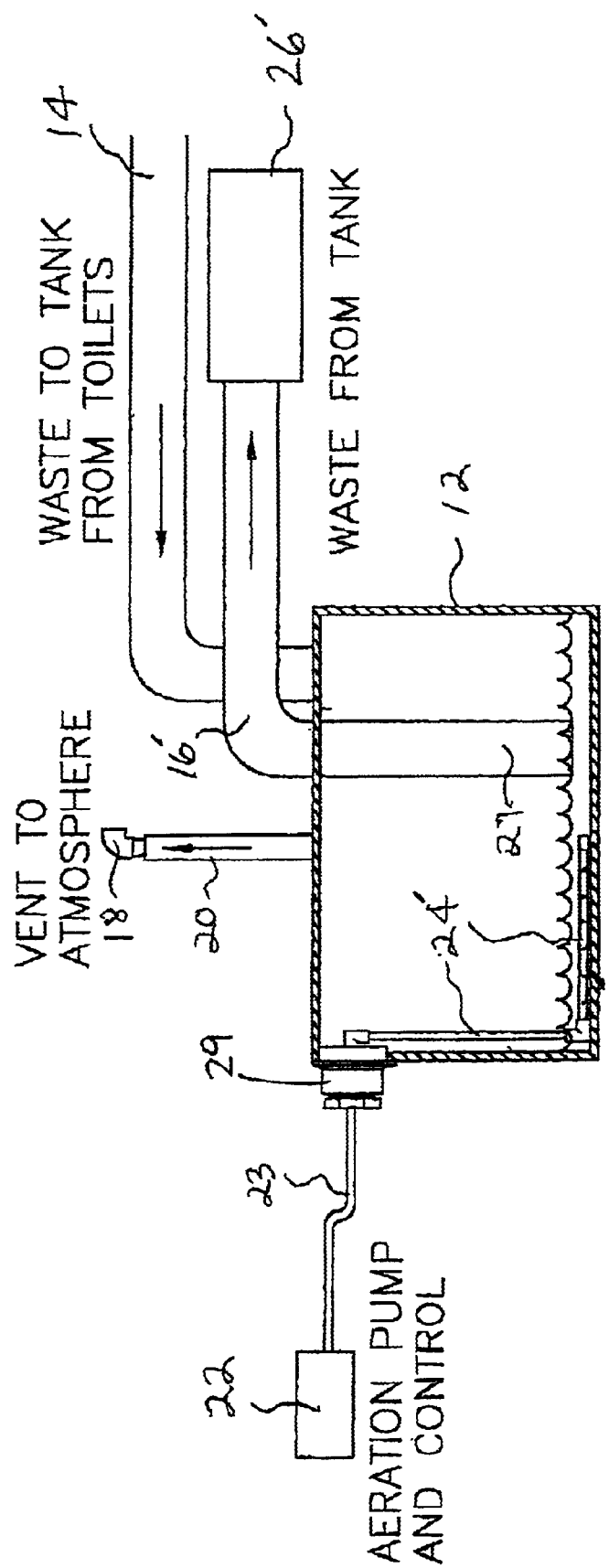
FIG. 5 schematically illustrates another example of the second embodiment of the present invention.

With reference to the examples of the second embodiment illustrated in FIGS. 4–5, it is noted that the second embodiment includes many components in common with the first embodiment illustrated in FIGS. 1–3 and described hereinbefore. Those common components will not be described hereinafter, however it is noted that pump 26' is shown to be disposed on the exterior of the holding tank 12, it is contemplated that such pump 26' may be an integral part of the holding tank, or it may be adapted to any existing holding tank.

The second embodiment utilizes an existing tank 12 and pump assembly 26' that is disposed outside of the tank 12. The pump assembly 26' is operable to chop solid waste so as to facilitate subsequent pumping of such waste from the tank 12 via the outlet pipe 16'. The pump suction inlet 27 is disposed near a bottom of the tank 12, but is spaced from the bottom so as to permit a desired volume of the sewage to remain therein when the tank is pumped out, for the reasons stated hereinbefore with reference to the first preferred embodiment of the tank.

The aeration tube 24' is in communication with the aeration pump 22 via the flexible tube 23. A sealed connector 29 links the flexible tube with the aeration tube 24, and is sealingly mounted or secured to the tank 12. In FIG. 4, the connector 29 is provided in the top of the tank 12 while in FIG. 5 the connector 29 is provided in the sidewall of the tank. In either case, the aeration tube 24' is preferably a rigid L-shaped tube having one end that communicates with flexible tube 23 from aeration pump 22 and a sealed or capped second opposite end. The submerged portion of the aeration tube 24' has a series of small holes or openings formed therein through which pressurized air from the aeration pump 22 and flexible tube 23 is forced from the tube 24' into the surrounding sewage. Preferably, either the aeration tube 24' or the flexible tube 23 has a check valve to prevent a back-flow or siphoning of sewage into the aeration tube 24' and/or the flexible tube 23 when the aeration pump 22 is turned off. The aeration tube 24' is made from a suitable corrosion-resistant material, such as a thermoplastic or stainless steel.

The present invention has been described herein with particularity. However, it is considered apparent that numerous modifications, rearrangements, and replacements of parts may be employed without departing from the scope and spirit of the invention as embodied in the claims appended hereto.

What is claimed is:

1. A marine vessel or RV, comprising:
   a waste holding tank received within said marine vessel or RV, said waste holding tank having an aeration tube disposed within a bottom portion of said tank;
   an aeration pump received within said marine vessel or RV, an output of said aeration pump being in fluid communication with said aeration tube, said aeration pump being adapted for continuous operation such that air is continuously communicated to said aeration tube;
   a discharge pump for pumping sewage from said waste holding tank;
   wherein an inlet to said discharge pump is designed and positioned such that, when said waste holding tank is completely pumped out, a volume of sewage is retained therein so that said aeration tube is continuously submerged in sewage, and wherein said aeration tube continuously provides air to said sewage to create an oxygen-enriched environment in said sewage, thereby assisting in reducing the odors emanating from the sewage within said holding tank.

2. The marine vessel or RV according to claim 1, wherein the waste holding tank further comprises an inlet for sewage, an outlet through which sewage is pumped-out of said holding tank, and a vent, said vent being continuously opened under the influence of air from the aeration pump injected into the tank via the aeration tube.

3. A method for reducing perceived odors emanating from a marine vessel or RV waste holding tank, said holding tank having an inlet through which sewage is introduced into said holding tank, an outlet through which sewage is pumped out of the holding tank, and a vent that permits gas to escape the holding tank, said holding tank receiving an aeration tube at a bottom portion of said tank, the method comprising the steps of:

submerging said aeration tube in sewage substantially continuously;

supplying pressurized air to said aeration tube substantially continuously to thereby inject air into said sewage surrounding said aeration tube and create an oxygen-enriched condition in the sewage; and, expelling air through said vent to gradually and continuously release air from said holding tank.

4. A marine vessel or RV, comprising:

a waste holding tank received within said marine vessel or RV;

a pump assembly, said pump assembly including a pump disposed in said waste holding tank and a mounting plate secured to said waste holding tank, said pump having an inlet disposed a distance from a bottom of said waste holding tank;

an aeration tube secured to said pump assembly and disposed within a bottom portion of said tank;

an aeration pump received within said marine vessel or RV, an output of said aeration pump being in fluid communication with said aeration tube, said aeration pump being adapted for continuous operation such that air is continuously communicated to said aeration tube;

wherein said pump inlet is designed and positioned such that, when said waste holding tank is completely pumped out, a volume of sewage is retained in the waste holding tank such that said aeration tube is continuously submerged in sewage, and wherein said aeration tube continuously provides air to said sewage to create an oxygen-enriched environment in said sewage, thereby assisting in reducing the odors emanating from the sewage within said holding tank.

5. The marine vessel or RV according to claim 4, wherein the waste holding tank further comprises an inlet for sewage, an outlet through which sewage is pumped-out of said holding tank by means of said pump, and a vent, said vent being continuously opened under the influence of air from the aeration pump injected into the tank via the aeration tube.

6. The marine vessel or RV according to claim 5, wherein a flexible tube extends between said aeration pump and said aeration tube, said flexible tube extending through an opening in said pump assembly mounting flange.

\* \* \* \* \*

UNITED STATES PATENT AND TRADEMARK OFFICE
Certificate

Patent No. 6,702,938 B2　　　　　　　　　　　　　　　　　　　　Patented: March 9, 2004

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Donald Gross, Hanover, MD; and Glen H. Stewart, Glenelg, MD.

Signed and Sealed this Twenty-third Day of August 2005.

DUANE S. SMITH
*Supervisory Patent Examiner*
Art Unit 1724